US008634085B2

United States Patent
Isogai et al.

(10) Patent No.: US 8,634,085 B2
(45) Date of Patent: Jan. 21, 2014

(54) IMAGE FORMING APPARATUS, IMAGE FORMING METHOD, AND COMPUTER READABLE MEDIUM

(75) Inventors: Masayuki Isogai, Tokyo (JP);
Masafumi Ono, Kanagawa (JP);
Kousuke Wakasugi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 320 days.

(21) Appl. No.: 13/225,109

(22) Filed: Sep. 2, 2011

(65) Prior Publication Data

US 2012/0182568 A1    Jul. 19, 2012

(30) Foreign Application Priority Data

Jan. 13, 2011 (JP) ................................. 2011-004757

(51) Int. Cl.
*G06F 3/12* (2006.01)
(52) U.S. Cl.
USPC ........................... 358/1.13; 358/1.1; 358/1.14
(58) Field of Classification Search
USPC .................................................. 358/1.1, 1.13
See application file for complete search history.

(56) References Cited

U.S. PATENT DOCUMENTS

2011/0004776 A1*  1/2011  Tanaka ......................... 713/323

FOREIGN PATENT DOCUMENTS

| JP | 01-185563 A | 7/1989 |
| JP | 08-220944 A | 8/1996 |
| JP | 2005-258957 A | 9/2005 |

\* cited by examiner

*Primary Examiner* — King Poon
*Assistant Examiner* — Iriana Cruz
(74) *Attorney, Agent, or Firm* — Sughrue Mion, PLLC

(57) ABSTRACT

An image forming apparatus includes the following elements. An apparatus body implements plural functions including an image reading function, an image forming function, and a display function. A controller controls first, second, and third power states. A first operation unit outputs a transition signal for shifting the states of the image reading function and the image forming function to the second power state. A second operation unit outputs a copy start signal for starting an operation to copy a document. A copy controller controls, when the functions other than the display function are in the third power state, the operation to copy a document in accordance with a copy start signal, and performs control so that another copy start signal is not handled during a period from when controlling of the operation to copy a document has started until when a predetermined specific state is detected.

9 Claims, 10 Drawing Sheets

IMAGE FORMING APPARATUS, IMAGE FORMING METHOD, AND COMPUTER READABLE MEDIUM

CROSS-REFERENCE TO RELATED APPLICATIONS

This application is based on and claims priority under 35 USC 119 from Japanese Patent Application No. 2011-004757 filed Jan. 13, 2011.

BACKGROUND

Technical Field

The present invention relates to image forming apparatuses, image forming methods, and computer readable media.

SUMMARY

According to an aspect of the invention, there is provided an image forming apparatus including: an apparatus body that implements plural functions including an image reading function of reading an image of a document, an image forming function of forming an image, and a display function of displaying content of information provided for a user; a controller that controls a first power state, a second power state, and a third power state, the first power state being a state in which one of the plural functions is being performed, the second power state being a state in which one of the plural functions is ready to be performed, the third power state being a state in which there is no power to perform any of the plural functions or the third power state being a state in which power is lower than power in the first power state or the second power state; a first operation unit that outputs, as a result of being operated by a user, a transition signal for shifting the state of the image reading function and the state of the image forming function to the second power state; a second operation unit that outputs, as a result of being operated by a user, a copy start signal for starting an operation to copy a document by using the image reading function and the image forming function; and a copy controller that controls, when the plural functions other than the display function are in the third power state, the operation to copy a document in accordance with a copy start signal which is output from the second operation unit after a transition signal is output from the first operation unit, and that performs control so that another copy start signal which is subsequently output from the second operation unit is not handled during a period from when controlling of the operation to copy a document has started until when a predetermined specific state is detected.

BRIEF DESCRIPTION OF THE DRAWINGS

Exemplary embodiments of the present invention will be described in detail based on the following figures, wherein.

DETAILED DESCRIPTION

Exemplary embodiments of the invention will be described below in detail with reference to the accompanying drawings.

Figure 1:
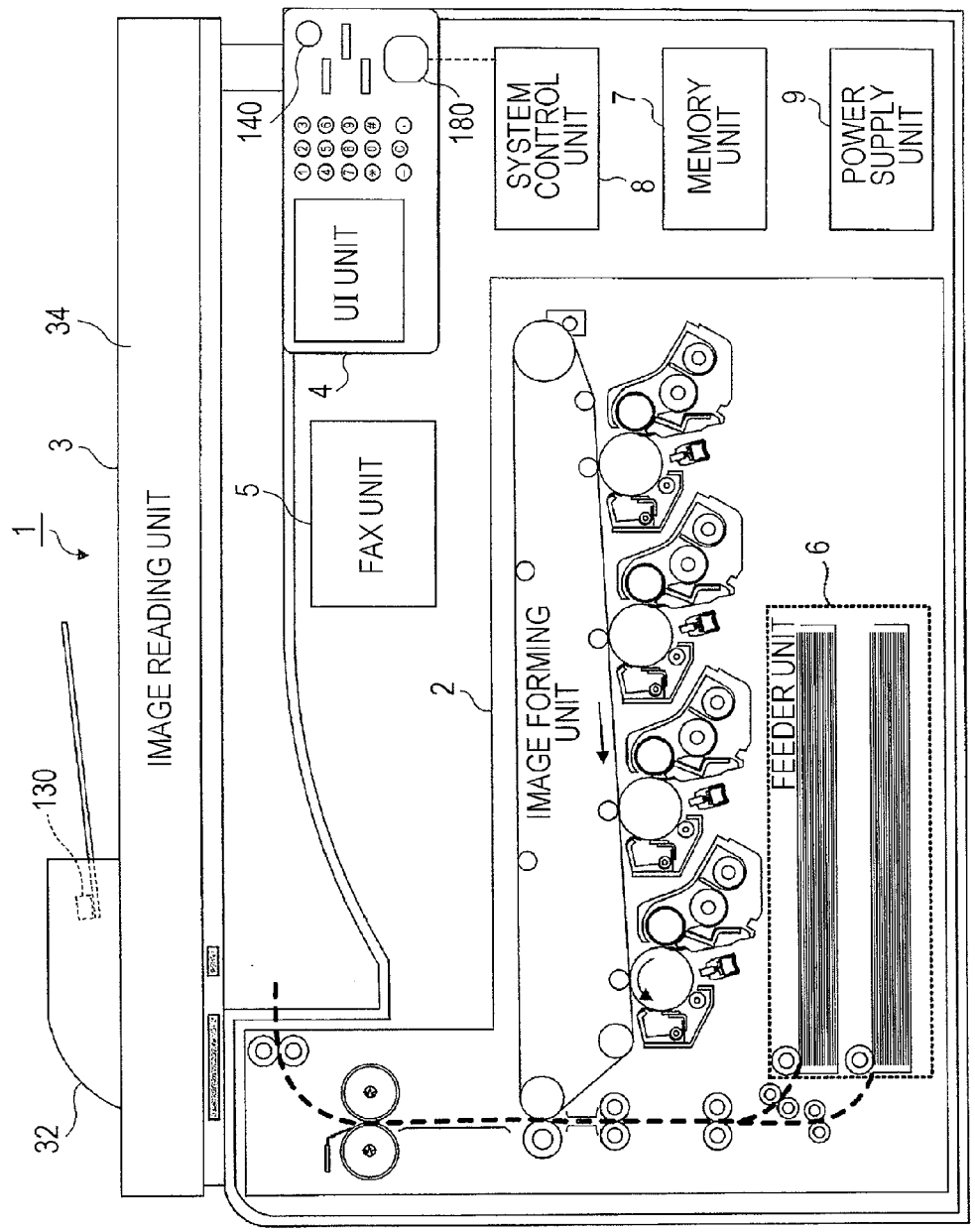
FIG. 1 illustrates an example of the entire configuration of an image forming apparatus according to an exemplary embodiment.

FIG. 1 illustrates an example of the entire configuration of an image forming apparatus 1 according to an exemplary embodiment of the present invention. The image forming apparatus 1 shown in FIG. 1, which serves as an example of an apparatus body, includes an image forming unit 2 and an image reading unit 3. The image forming unit 2 forms images on the basis of image data of corresponding colors (image information). The image reading unit 3 reads an image formed on a document so as to generate image data and sends the generated image data to the image forming unit 2. The image forming unit 2 prints stored images, and the image reading unit 3 performs reading in accordance with the color mode and the resolution specified by a user. The image reading unit 3 includes au auto document feeder (ADF) 32 and a platen cover 34 that covers platen glass.

The image forming apparatus 1 also includes a user interface (UI) unit 4 and a facsimile (FAX) unit 5. The UI unit 4 receives operations input from a user and displays various types of information for a user. The FAX unit 5 sends and receives image information via, for example, a public switched telephone network.

The image forming apparatus 1 also includes a feeder unit 6 and a memory unit 7, which serves as an external storage device. The feeder unit 6 is disposed within the housing of the image forming unit 2 or is attached to the image forming unit 2 as an external device so as to supply paper to the image forming unit 2. The image forming apparatus 1 also includes a system control unit 8 and a power supply unit 9. The system control unit 8 controls the entire operation of the image forming apparatus 1 or communication performed via a communication line. The power supply unit 9 supplies power to the individual components of the image forming apparatus 1.

Figure 2:
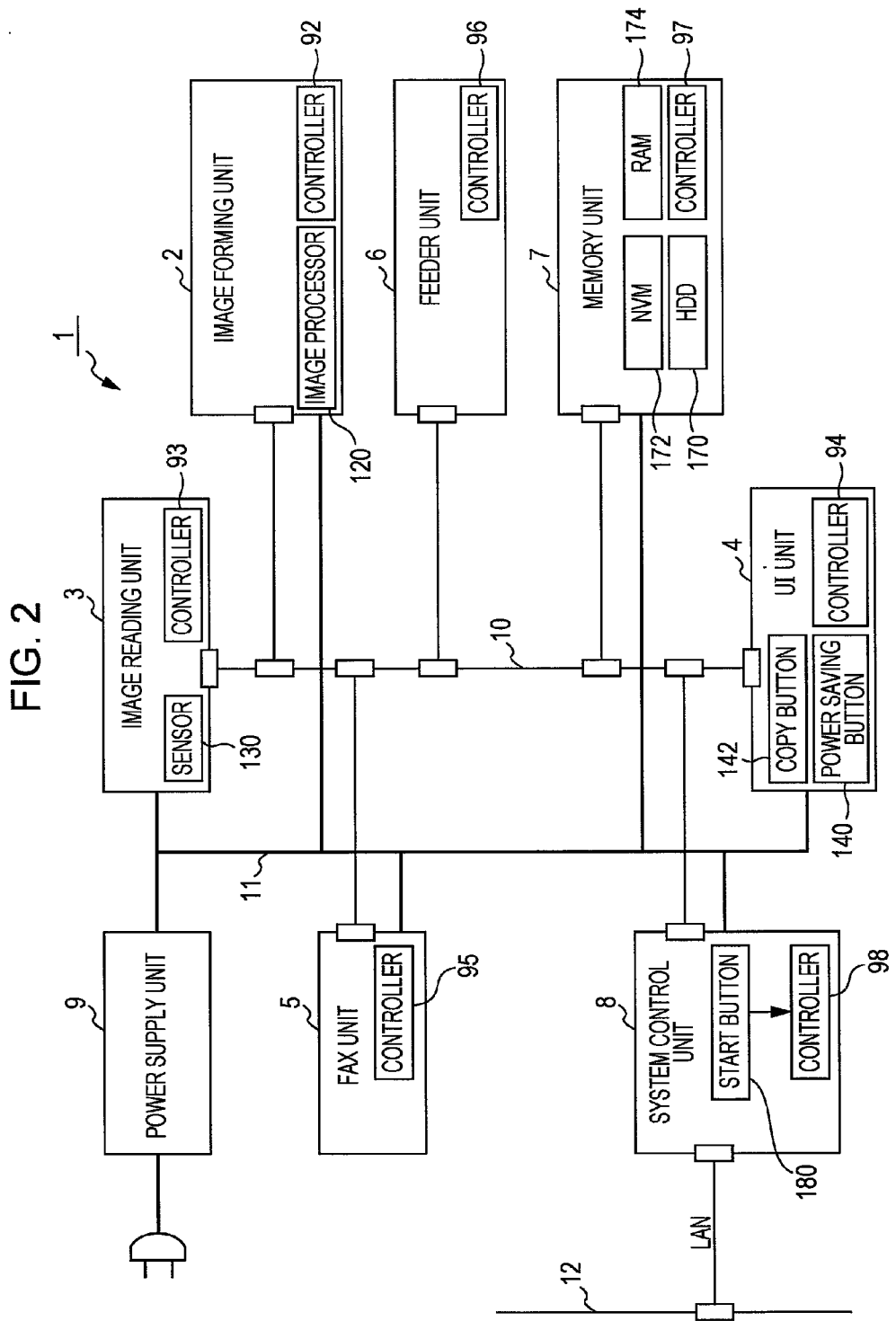
FIG. 2 illustrates an example of the functional configuration of the image forming apparatus shown in FIG. 1.

FIG. 2 illustrates the functional configuration of the image forming apparatus 1 shown in FIG. 1. In this exemplary embodiment, the image forming unit 2, the image reading unit 3, the UI unit 4, the FAX unit 5, the feeder unit 6, the memory unit 7, and the system control unit 8 are connected to an internal local area network (LAN) 10, which serves as an example of an internal communication unit. In this exemplary embodiment, the above-described units, which serve as control functions or an image forming function, are connected to one another via a single bus (internal LAN 10) so as to perform communication among the units. In this respect, the image forming apparatus 1 of this exemplary embodiment is different from the related art. That is, in the related art, units of an image forming apparatus are connected to one another via different control buses in order to perform communication.

In this exemplary embodiment, the units of the image forming apparatus 1 are connected to external devices by using an external LAN 12 via the system control unit 8.

Each unit is provided with a controller for determining the state of power supply (ON or OFF) and for controlling as to whether power is to be supplied or stopped. Details of determination and control for power supply will be discussed later. The controllers will be described more specifically below. An image forming controller 92 is provided for the image forming unit 2. An image reading controller 93 is provided for the image reading unit 3. a UI controller 94 is provided for the UI unit 4. A FAX controller 95 is provided for the FAX unit 5. A feeder controller 96 is provided for the feeder unit 6. A memory controller 97 is provided for the memory unit 7. A system control unit controller 98 is provided for the system control unit 8.

The above-described controllers may be formed by central processing units (CPUs) or application specific integrated circuits (ASICs).

The image forming unit 2 is also provided with an image processor 120 that performs image processing, such as enlarging/reducing, compressing/non-compressing, and editing of images, adjusting the image quality, etc.

The image reading unit 3 is provided with a document detection sensor 130, which serves as an example of a document ready detector, configured to detect that a document (to be copied) has been set in the document feeder (ADF) 32 (see FIG. 1) by a user. The UI unit 4 is provided with a power saving button 140 that allows a user to change the power mode. Details of the power modes will be discussed later. By use of the power saving button 140, the user is able to give an instruction to shift to or return from the power saving mode. The UI unit 4 is also provided with a copy button 142, which serves as a first operation unit, and other buttons (not shown), such as a scanner button and a fax button. A transparent touch panel may be disposed on the screen that displays images, and the above-described buttons may be provided on the transparent touch panel.

The document detection sensor 130 may be configured to detect that a document has been set by a user when the platen cover 34 is opened and closed. In this case, such a detection mechanism serves as an example of the document ready detector.

The memory unit 7 is provided with a hard disk drive (HDD) 170, which serves as a first storage medium that includes a rotary mechanism and is rotated by the rotary mechanism so as to store images, a non-volatile memory (NVM) 172, which serves as a second storage medium without having a rotary mechanism, and a random access memory (RAM) 174, which is used as a work area for images that have not been stored in the HDD 170 or that have not been processed in the image processor 120. The HDD 170 is a storage device in which a disk coated with a magnetic material is driven to be rotated and data is read or written from or into the disk with use of a magnetic head. The NVM 172 is a storage device which is rewritable and can retain data even after power is OFF. The NVM 172 may be a flash memory or an electrically erasable and programmable read only memory (EEPROM). The NVM 172 is used for storing information which is set by the system or for storing the frame area size. The parameters are examples of information used for implementing plural functions, and the NVM 172 is an example of an information storage unit for storing such information.

The system control unit 8 is provided with a start button 180, which is an example of a second operation unit. The second operation unit (start button 180) is operated by the user so as to output a signal for serving as an image forming function. The start button 180 is connected to the system control unit controller 98 via a hot line. That is, the start button 180 is a key for directly requesting the system control unit controller 98 to execute processing concerning system control. That is, the start button 180 can be considered as a function similar to a hotkey.

A power line 11 is connected to the image forming unit 2, the image reading unit 3, the UI unit 4, the FAX unit 5, the feeder unit 6, the memory unit 7, and the system control unit 8. Power is supplied to those units via the power supply unit 9 connected to the power line 11. The power supply unit 9 constantly supplies power of a predetermined voltage (24 V) as an uninterruptible power supply.

The image forming unit 2, which serves as an image forming function, and the image reading unit 3, the UI unit 4, the FAX unit 5, the feeder unit 6, the memory unit 7, and the system control unit 8, all of which serve as corresponding control functions, are configured to individually control power modes, for example as follows, (i) the power OFF mode during the system sleep, (ii) the power ON (5 V) mode in the standby state, and (iii) the power ON (24 V) mode in the job execution state. The above-described units (the image forming function and the individual control functions) control the power modes as follows. The image forming function and the individual control functions determine the states of the corresponding systems or appropriately determine the lapse of time after a certain operation has been performed so as to change the power mode. More specifically, the image forming controller 92, the image reading controller 93, the UI controller 94, the FAX controller 95, the feeder controller 96, the memory controller 97, and the system control unit controller 98 determine on their own the states of power supply (ON or OFF) from information obtained via the internal LAN 10, which serves as an internal communication unit, so as to control on their own as to whether power from the power supply unit 9 is to be supplied or stopped. Thus, the image forming controller 92, the image reading controller 93, the UI controller 94, the FAX controller 95, the feeder controller 96, the memory controller 97, and the system control unit controller 98 also each serve as an information obtaining unit that obtains information sent via the internal LAN 10.

It is noted that supplying/stopping of power is controlled among the individual units, and also, among the components (devices) of the individual units. That is, the devices forming the individual units are connected to a unit LAN. The controllers provided for the individual units determine the states of power supply (ON or OFF) to the units so as to allow the individual units to control on their own as to whether power is to be supplied or stopped.

The image forming unit 2, the image reading unit 3, and the FAX unit 5 can determine on their own the transition among a power OFF state, which serves as a third power state, a power ON (5 V) state, which serves as a second power state, and a power ON (24 V) state, which serves as a first power state. The UI unit 4 can determine on its own the transition among a power OFF state, which serves as the third power state, a light emitting diode (LED) OFF state, which serves as a second power state, and a power ON (24 V) state, which serve as a first power state.

The system control unit 8 can determine on its own the transition among a power OFF state, which serves as a third power state, a CPU OFF state, which serves as a fourth power state, a power ON (5 V) state, which serves as a second power state, a power ON (24 V) state, which serves as a first power state. The CPU OFF state is a state in which the CPU is turned OFF during the standby mode.

The power modes will be discussed more specifically below.

Description of Each Unit

Supplying/stopping of power control operations performed in each unit will be described below by taking the image forming unit 2 as a typical example.

Figure 3:
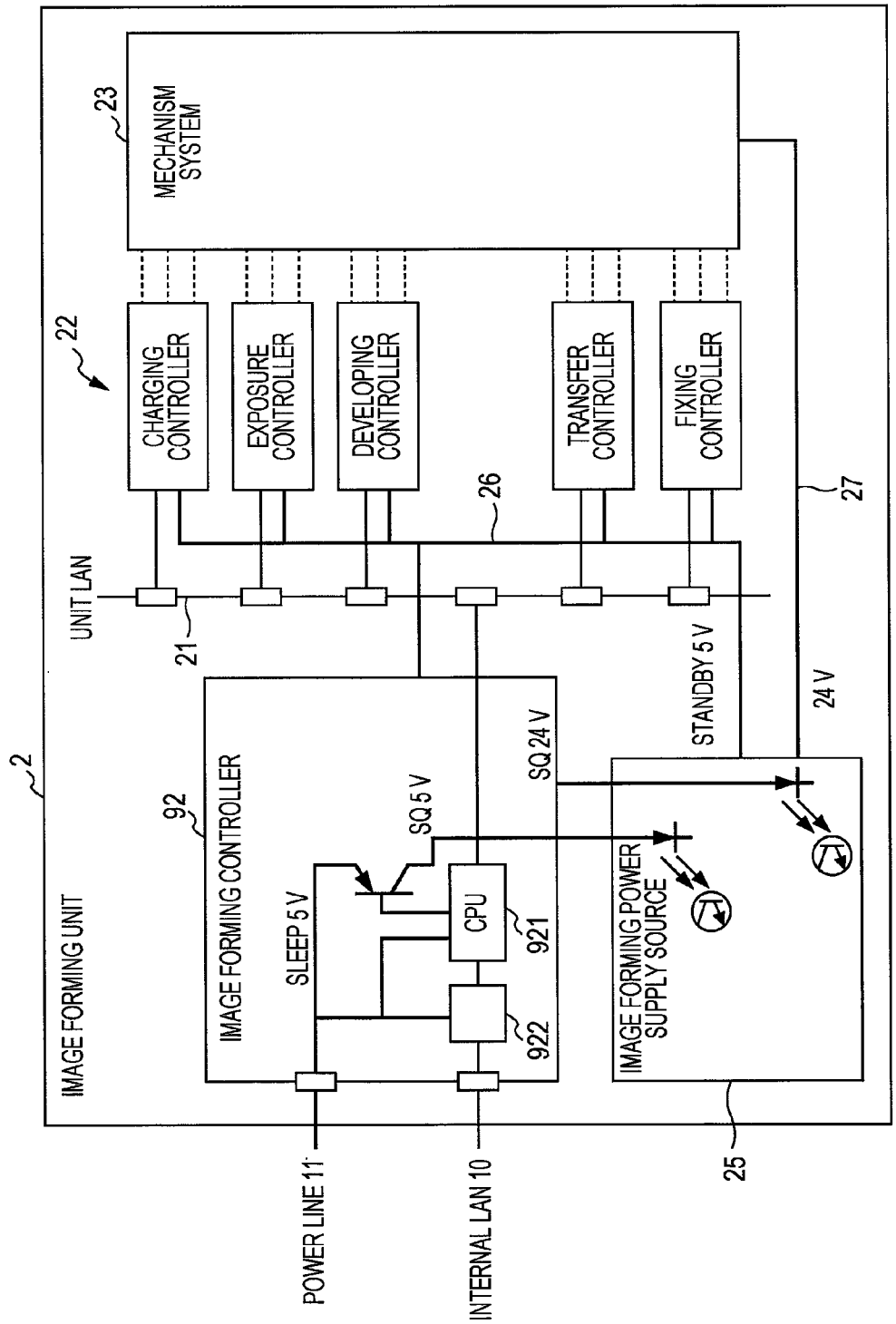
FIG. 3 illustrates an example of the functional configuration of an image forming unit.

FIG. 3 illustrates the functional configuration of the image forming unit 2. The image forming unit 2, which serves as the image forming function, performs image forming processing on the basis of image data of individual colors. In the image forming unit 2 shown in FIG. 3, various controllers 22, which serve as controllers for individual devices forming the image forming unit 2, are connected to a unit LAN 21. The various controllers 22 include a charging controller, an exposure controller, a developing controller, a transfer controller, and a fixing controller, which control electrophotographic-system image forming processing. The various controllers 22 control various mechanisms (devices) of a mechanism system 23. More specifically, the various controllers 22 control operations of a motor, a solenoid, a clutch, etc., disposed in the mechanism system 23 through use of a mechatronics IN/OUT (I/O). The mechanism system 23 also controls process setting values which are supplied to devices provided in the mechanism system 23, such as to a charger used for charging a photoconductor drum and a laser exposure device used for exposing the photoconductor drum to a laser beam.

Additionally, the image forming controller 92 is connected to the unit LAN 21. The image forming controller 92 includes a CPU 921 for controlling the image forming controller 92 and a command filter 922 connected to the internal LAN 10 so as to filter commands obtained from the internal LAN 10. For example, when information to which a command indicating that processing is to be performed by the image forming unit 2 has been appended is sent by broadcasting via the internal LAN 10, the command filter 922 selects such a command. If uninterruptible power (e.g., 5 V) provided from the power supply unit 9 via the power line 11 is supplied only to the command filter 922 that detects LAN commands, the CPU 921 can be switched OFF during the standby mode, thereby achieving further power saving.

Each unit forming the image forming apparatus 1, such as the image forming unit 2, includes a power supply source for the corresponding unit. An image forming power supply source 25 is provided for the image forming unit 2 shown in FIG. 3 and is operated under the control of the image forming controller 92. In each unit, power is supplied from the corresponding power supply source to the individual controllers. The image forming unit 2 shown in FIG. 3 is provided with a control power line 26 through which standby power (5 V) is supplied from the image forming power supply source 25 to the various controllers 22. The image forming unit 2 is also provided with an operating power line 27 through which operating power (24 V) is supplied from the image forming power source 25 to the mechanism system 23.

Operation for Transition of Power Mode

A description will now be given of operations performed by the image forming function, the control functions, and an integrated control function.

Figure 4:
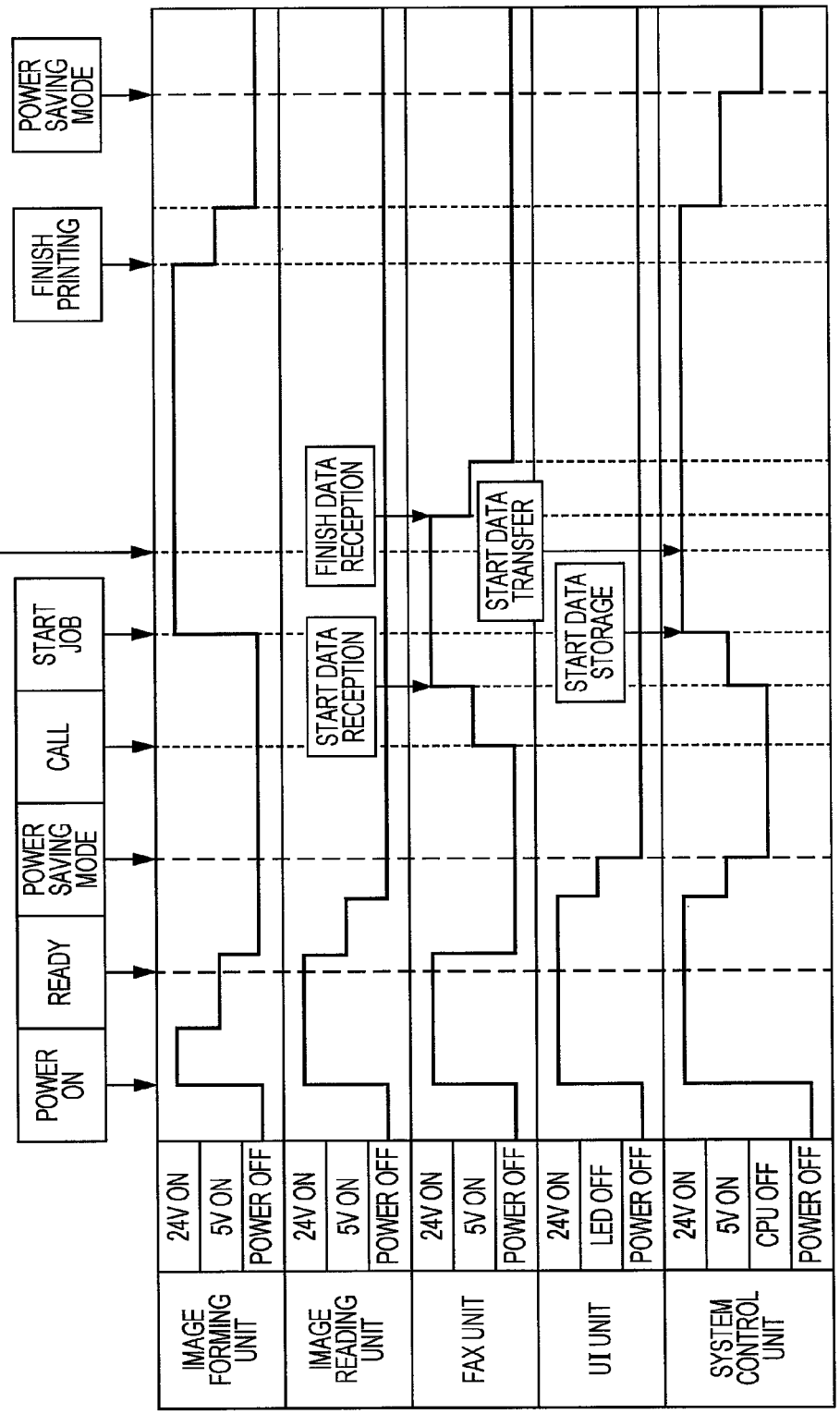
FIG. 4 illustrates a transition state of power modes upon receiving FAX data.
Figure 5:
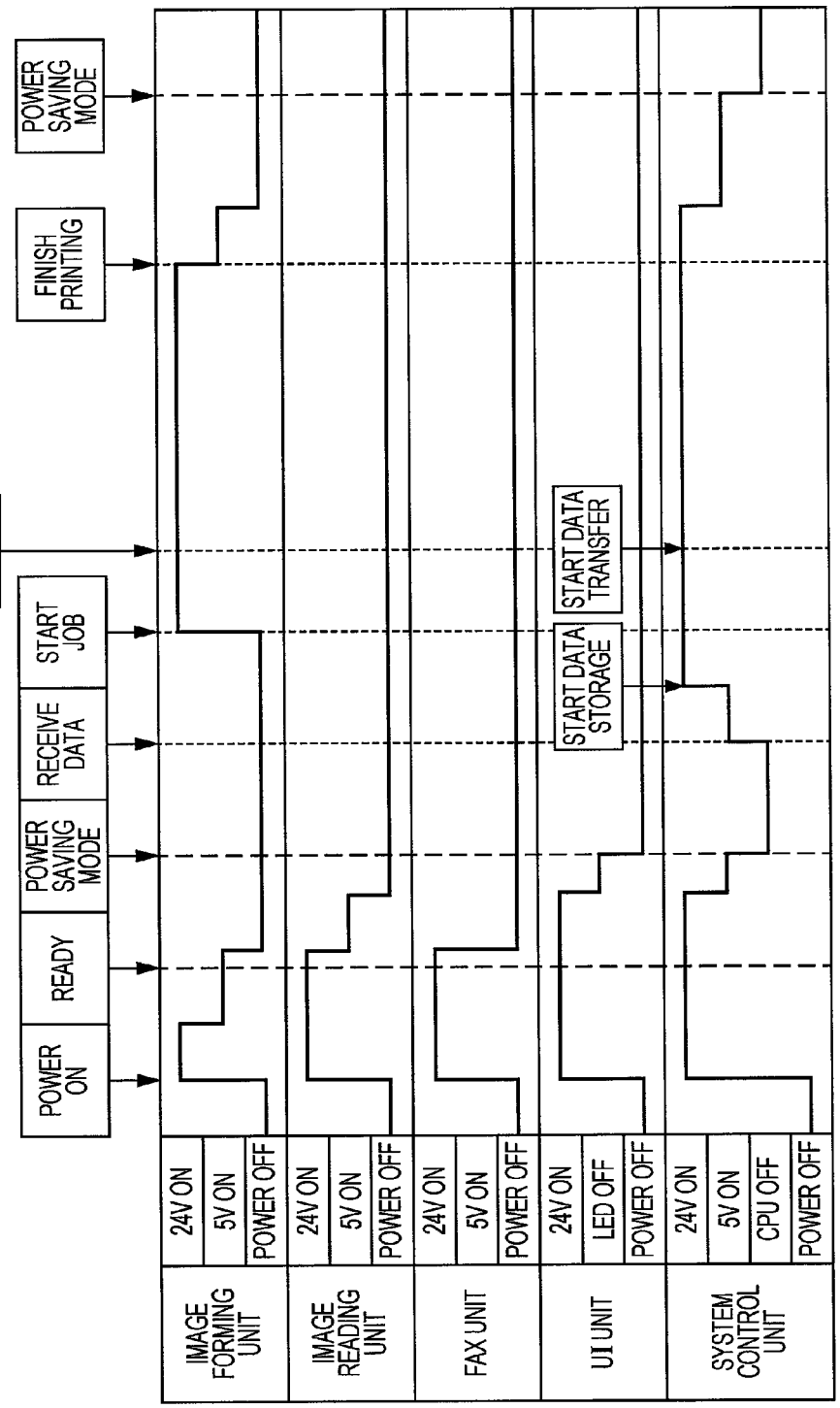
FIG. 5 illustrates a transition state of power modes upon receiving print job data.
Figure 6:
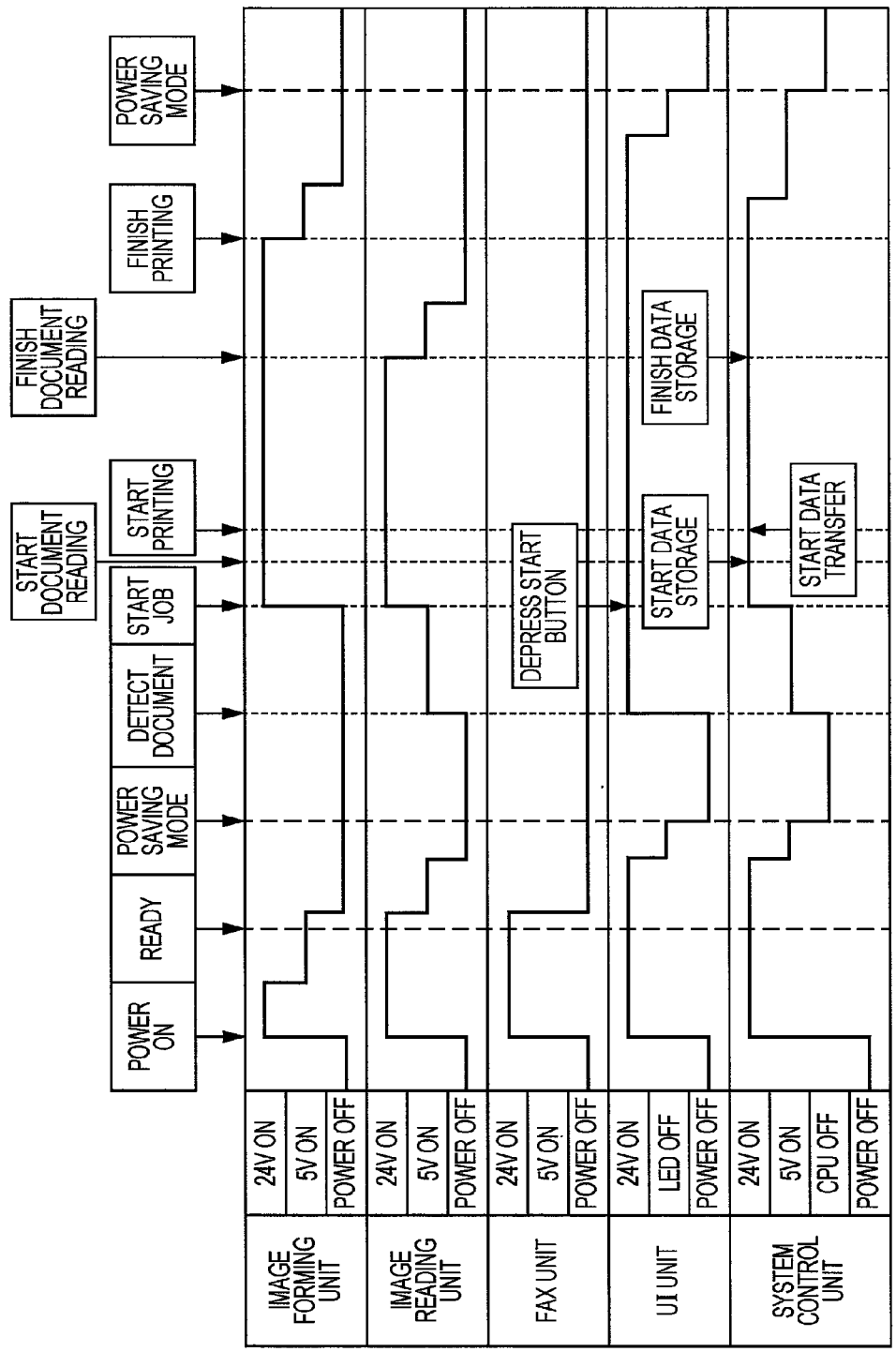
FIG. 6 illustrates a transition state of power modes when performing copying processing.

FIGS. 4 through 6 illustrate transition states among three different modes of the image forming unit 2, the image reading unit 3, the FAX unit 5, the UI unit 4, and the system control unit 8. Each unit determines and changes on its own the power mode, thereby maintaining the power saving state in accordance with the function of the corresponding unit. In this example, the image forming unit 2, the image reading unit 3, and the FAX unit 5 can individually determine on their own the transition among the following three power states: the power OFF state; the power ON (5 V) state; and the power ON (24 V) state. The UI unit 4 can determine on its own the transition of the following three states: the power OFF state; the LED OFF state; and the power ON (24 V) state. The system control unit 8 can determine on its own the transition among the following four states: the power OFF state; the CPU OFF state; the power ON (5 V) state; and the power ON (24 V) state.

Transition of Power Mode Upon Receiving Fax Data

FIG. 4 illustrates a transition state of the power mode upon receiving FAX data.

"POWER ON" shown in FIG. 4 indicates, for example, a state in which the switch of the entire image forming apparatus 1 (main switch) is changed from OFF to ON, which causes each unit to start an initialization operation.

"READY" shown in FIG. 4 indicates a state in which various image processing operations, such as printing, copying, and operations using a FAX and a scanner, are ready to be performed, and the initialization operation of each unit has finished. The image forming unit 2, the image reading unit 3, the FAX unit 5, and the UI unit 4 each perform an initialization operation, and then, send by broadcasting via the internal LAN 10 a command indicating that the corresponding unit has finished the initialization operation and has entered the ready state. The system control unit 8 identifies that the corresponding unit has entered the ready state, and provides, if necessary, information indicating that, for example, the information processing apparatus 1 has entered the ready state to external devices. Units which do not have to start operating immediately after the initialization operation determine on their own to reduce the power level so as to achieve power saving. Units that do not have to operate after the initialization operation enter the non-operating state, thereby maintaining the efficient power saving state.

It is noted that "broadcasting" means to send via the internal LAN 10 information to which a command has been appended to all units connected to the internal LAN 10.

"POWER SAVING MODE" shown in FIG. 3 indicates a state in which the UI unit 4 or the system control unit 8 has entered the saving mode when image information is not input after the lapse of a predetermined time after the corresponding unit has entered the ready state. Such a saving state can be recognized by the user. In this power saving mode, light provided for the panel of the UI unit 4 is also turned OFF (LED OFF state), and the system control unit controller 98 of the system control unit 8 is turned OFF (CPU OFF state). However, in the system control unit 8, a function (ASIC) of monitoring the reception of print job data from an external device via the external LAN 12 or an input of an operation from a user performed on the UI unit 4 is turned ON even during the power saving mode. Upon receiving print job data or an input of an operation from a user, the ASIC changes the system control unit controller 98 from the CPU OFF state to the power ON state (5 V).

The power OFF state of the units other than the system control unit 8 can be changed upon receiving an external interrupt.

This will be described in more detail with reference to FIGS. 2 and 4.

Power is supplied from the power supply unit 9 via the power line 11 so as to cause the image forming apparatus 1 to start, and then, the units perform, if necessary, initialization operations in the power modes corresponding to the functions of the units. In this case, if it is necessary to synchronize the units with each other when performing the initialization operations, the system control unit 8 communicates with the corresponding units in order to obtain required statuses from the units. Basically, however, in this exemplary embodiment, each unit performs its own initialization operation independently. Accordingly, when power is ON, the image forming unit 2, the image reading unit 3, the UI unit 4, the FAX unit 5, and the system control unit 8 shift from the power OFF state to the power ON (24 V) state. Although it is not shown in FIG. 4, the same applies to the feeder unit 6 and the memory unit 7. In this power ON state, each unit performs its own initialization operation. More specifically, each unit performs its own initialization operation under full power and determines on its own to finish the initialization operation after the lapse of a predetermined time, and also determines on its own to reduce the power level to a level which is lower than the full power level after the lapse of a predetermined time after the initialization operation.

That is, the image forming controller 92 of the image forming unit 2 determines on its own to shift the power mode from the power ON (24 V) state to the power ON (5 V) state during the initialization operation on the basis of its own criteria. This is because of the following reason. The image forming unit 2 can finish the initialization operation for the devices provided in the image forming unit 2 in a comparatively short period of time. Accordingly, upon finishing the initialization operation for the devices, the power mode is shifted from the power ON (24 V) state which is necessary for operating all the devices in the image forming unit 2 to the power ON (5 V) state which is necessary for operating the CPU, which is a component that controls the image forming unit 2.

Then, after shifting to the ready state upon completion of the initialization operation, the image forming controller 92 determines on its own to change the power mode from the power ON (5 V) state to the power OFF state in accordance with its own criteria.

Concerning the image reading unit 3, it takes time to perform various types of setting processing for the devices provided in the image reading unit 3 during the initialization operation. Accordingly, the image reading unit 3 finishes the initialization operation in the power ON (24 V) state which is necessary for operating all the devices in the image reading unit 3. Then, after shifting to the ready state upon completion of the initialization operation, the image reading controller 93 of the image reading unit 3 determines on its own to change the power mode from the power ON (24 V) state to the power ON (5 V) state in accordance with its own criteria. With the provision of the power ON (5 V) state, if, during this period, a copying instruction or an image reading instruction is received from a user, the time taken to perform initialization for communication is reduced, thereby making it possible to provide an output to the user more speedily. After the ON (5 V) state, the image reading controller 93 determines on its own to shift to the power OFF state in accordance with its own criteria.

The FAX unit 5 finishes the initialization operation in the power ON (24 V) state. Then, after shifting to the ready state upon completing the initialization operation, the FAX controller 95 of the FAX unit 5 determines on its own to shift from the power ON (24 V) state to the power OFF state without shifting to the power ON (5 V) state in accordance with its own criteria.

Concerning the UI unit 4, upon completion of the initialization operation and even after shifting to the ready state, the UI unit 4 determines on its own to maintain the ON (24 V) state for a period longer than that of the image reading unit 3 or the FAX unit 5 in accordance with its own criteria. This is because of the following reason. In a case in which an instruction, such as a copying instruction, is input from a user, the time required to start the system is reduced so as to start the corresponding operation without any delay. Then, the UI controller 94 determines on its own to temporarily shift to the power ON (5 V) state and further to the power OFF state in accordance with its own criteria.

In a manner similar to the ON state of the UI unit 4, in the system control unit 8, after shifting to the ready state upon completion of the initialization operation, the system control unit controller 98 of the system control unit 8 determines on its own to maintain the power ON (24 V) state for a certain period in accordance with its own criteria. With the provision of this period, it is possible to maintain a state in which processing can be promptly started in response to various instructions, such as an image processing instruction, from a user. Then, the system control unit controller 98 determines on its own to temporarily shift to the power ON (5 V) state and further shifts to the CPU OFF state in accordance with its own criteria.

If the FAX unit 5 detects a call after shifting to the power saving mode, as shown in FIG. 4, the FAX controller 95 of the FAX unit 5 shifts from the power OFF state to the power ON (5 V) state. Then, the FAX controller 95 performs communication negotiation in order to establish communication with a sender regarding information concerning the communication speed, the data format, etc., in order to receive FAX data. Upon completion of communication negotiation, the FAX controller 95 shifts the power ON (5 V) state to the power ON (24 V) state so as to turn ON the mechanism system of the FAX unit 5. Thus, the FAX unit 5 starts receiving FAX data.

Upon starting to receive the FAX data, the FAX controller 95 determines from information obtained from the FAX data whether the FAX data is to be stored in a box provided in the memory unit 7 or whether an image is to be immediately formed in the image forming unit 2. Then, a command corresponding to a result of this determination is sent by broadcasting to the individual units via the internal LAN 10. More specifically, the FAX controller 95 sends by broadcasting a command to store the FAX data in a box provided in the memory unit 7 or a command to form an image in the image forming unit 2 to the other units via the internal LAN 10.

In the example shown in FIG. 4, the FAX controller 95 sends by broadcasting a command to form an image (image forming command) included in the FAX data.

Upon receiving the image forming command by broadcasting via the internal LAN 10, the individual units determine on their own to set the power mode.

More specifically, upon receiving the image forming command from the FAX unit 5, the above-described ASIC causes the system control unit 8 to shift from the CPU OFF state to the power ON (5 V) state. Then, the system control unit controller 98 identifies the image forming command so as to shift the power mode of the system control unit 8 to the power ON (24 V) state. Accordingly, the system control unit 8 starts storing the FAX data (image data) received by the FAX unit 5 in a flash memory provided in the system control unit 8. Along with this, the system control unit controller 98 sends by broadcasting a command (job start command) to start performing image forming processing (job) on the stored FAX data to the other units via the internal LAN 10.

In the image forming unit 2, upon receiving the job start command from the system control unit 8, the image forming controller 92 shifts the power mode of the image forming unit 2 from the power OFF state to the power ON (24 V) state, thereby turning ON the mechanism system 23 (see FIG. 3) of the image forming unit 2 to start the image forming pre-operation (starting the job). More specifically, a warm-up operation for setting up a fixing device included in the mechanism system 23 to be ready for a fixing operation. Upon completion of the warm-up operation of the fixing device, the image forming controller 92 sends by broadcasting a command indicating that the warm-up operation has finished (warm-up completion notification command) to the other units via the internal LAN 10.

In the system control unit 8, upon receiving the warm-up completion notification command, the system control unit controller 98 transfers the stored image data to the image forming unit 2.

The image forming unit 2 then starts forming (printing) an image on the basis of the image data obtained from the system control unit 8.

Although it is not shown in FIG. 4, the feeder unit 6 also starts an operation for feeding paper after a procedure similar to that described above.

In this case, the image forming controller 92 and the feeder controller 96 of the feeder unit 6 send by broadcasting a command indicating that the image forming operation has started (image forming start notification command) to the other units via the internal LAN 10.

In contrast, it is not necessary that the image reading unit 3 perform an operation in response to the image forming command from the FAX unit 5 or the job start command from the system control unit 8. Accordingly, the image reading unit 3 maintains the power mode in the power OFF state.

It is also not necessary that the UI unit 4 perform an operation in response to the image forming command from the FAX unit 5 or the job start command from the system control unit 8. Accordingly, the UI unit 4 maintains the power mode in the power OFF state.

In the image forming unit 2 or in the feeder unit 6 that has started printing, the various controllers 22 provided in the image forming unit 2 or the feeder controller 96 provided in the feeder unit 6 may respectively determine the states of power supply/stop (ON or OFF) for the devices (mechanism system 23) forming the image forming unit 2 or the devices forming the feeder unit 6 and for the controllers themselves, and may control as to whether power is to be supplied or stopped (ON or OFF) for those devices and the controllers themselves.

This will be discussed more specifically by taking the image forming unit 2 as an example. The image forming unit 2 includes, as devices, a charger for charging the photoconductor drum on which toner images of individual colors are formed, a laser exposure device for exposing the photoconductor drum to a laser beam, and a developing device for developing latent images formed on the photoconductor drum. The image forming unit 2 also includes a first transfer device that sequentially transfers the toner images of the individual colors formed on the photoconductor drum onto an intermediate transfer member, a second transfer device that simultaneously transfers the toner images of the individual colors formed on the intermediate transfer member onto paper, and a fixing device for fixing the toner images on the paper. Among those devices, there are many devices that do not have to be constantly operating during the image forming operation. Thus, upon receiving the job start command from the system control unit 8, the various controllers 22 (charging controller, exposure controller, developing controller, a transfer controller, fixing controller, etc.), which serve as the controllers of the individual devices, calculate, for the corresponding devices, times (operation times) at which the corresponding devices are to be operated. Then, the various controllers 22 control, on their own, supplying/stopping of power (ON or OFF) for the corresponding controllers and for the corresponding devices in accordance with the calculated times for the corresponding devices. Thus, power is supplied to the various controllers 22 and the corresponding devices in accordance with the calculated times. As a result, power saving can be achieved in each device.

Referring back to the description of the FAX unit 5, upon completion of receiving the FAX data, the FAX controller 95 shifts the power mode from the power ON (24 V) state to the power ON (5 V) state, thereby turning OFF power supplied to the mechanism device of the FAX unit 5. However, the FAX controller 95 maintains its operating state (5 V) for a predetermined period in order to wait for receiving subsequent FAX data. The FAX controller 95 also sends by broadcasting a command indicating that the reception of FAX data has finished (reception completion notification command) to the other units via the internal LAN 10.

Upon receiving the reception completion notification command from the FAX unit 5, the system control unit controller 98 of the system control unit 8 identifies this command, and then completes the processing for storing the FAX data received by the FAX unit 5. However, the system control unit 8 is still required to continue transferring the stored FAX data to the image forming unit 2. The system control unit 8 has also identified from the image forming start notification command from the image forming unit 2 and the feeder unit 6 that the image forming operation is being performed in the image forming unit 2 and the feeder unit 6. Accordingly, the system control unit controller 98 maintains the power ON (24 V) state in order to transfer the FAX data and to monitor the operation of the entire image forming apparatus 1.

Referring back to the description of the image forming unit 2, upon completion of printing by the image forming unit 2, the image forming controller 92 shifts the power mode of the image forming unit 2 from the power ON (24 V) state to the power ON (5 V) state, thereby turning OFF power supplied to the mechanism system 23 of the image forming unit 2. However, the image forming controller 92 maintains its operating state (5 V) for a predetermined period in order to receive various image data including subsequent FAX data. The image forming controller 92 also sends by broadcasting a command indicating that printing has finished (image forming completion notification command) to the other units via the internal LAN 10. Then, if image data is not input after the lapse of a predetermined time, power to the image forming controller 92 is turned OFF, and the image forming unit 2 shifts to the power OFF state.

Although it is not shown in FIG. 4, the same applies to the feeder unit 6.

In the system control unit 8, upon receiving the image forming completion notification command from the image forming unit 2, the system control unit controller 98 maintains the power ON (24 V) state for a predetermined period, and then shifts to the power ON (5 V) state, thereby turning OFF power supplied to the mechanism system of the system control unit 8. However, the system control unit controller 98 maintains its operating state (5 V) for a predetermined period in order to wait for an input of a command received by broadcasting from the individual units via the internal LAN 10. If no command is input from any of the units after the lapse of a predetermined time, the system control unit 8 determines that no image information (various image data) is input into the image forming apparatus 1. Thus, the system control unit controller 98 shifts to the CPU OFF state so as to set the power saving mode.

Transition of Power Mode Upon Receiving Print Job Data

FIG. 5 illustrates a transition state of the power mode upon receiving print job data.

As in the reception of FAX data, upon reception of print job data, the transition of the power mode in the individual units from when the image forming apparatus 1 is started after power is supplied from the power supply unit 9 via the power line 11 until when the image forming apparatus 1 shifts to the power saving mode is similar to that in the case of FAX reception shown in FIG. 4.

After shifting to the power saving mode, as shown in FIG. 5, upon receiving print job data by the system control unit 8 from an external device via the external LAN 12, the above-described ASIC provided for the system control unit 8 shifts the system control unit controller 98 from the CPU OFF state to the power ON (5 V) state. Then, the system control unit controller 98 starts communication negotiation with the external device.

After establishing communication with the external device, the system control unit controller 98 shifts the power mode from the power ON (5 V) state to the power ON (24 V) state, thereby turning ON the mechanism system including the communication mechanism of the system control unit 8. The communication mechanism then starts receiving the print job data and starts storing the print job data in, for example, a flash memory within the system control unit 8.

When a predetermined amount of print job data is stored by the communication mechanism, the system control unit controller 98 sends by broadcasting a command (job start command) to start performing image forming processing (job) on the stored print job data (image data) to the other units via the internal LAN 10.

Upon receiving the job start command via the internal LAN 10, the individual units determine on their own to set the power mode.

More specifically, in the image forming unit 2, upon receiving the job start command from the system control unit 8, the image forming controller 92 shifts the power mode of the image forming unit 2 from the power OFF state to the power ON (24 V) state, thereby turning ON the mechanism system 23 (see FIG. 3) of the image forming unit 2 to start the image forming pre-operation (starting the job). More specifically, a warm-up operation for setting up a fixing device included in the mechanism system 23 to be ready for a fixing operation is started. Upon completion of the warm-up operation of the fixing device, the image forming controller 92 sends by broadcasting a command indicating that the warm-up operation has finished (warm-up completion notification command) to the other units via the internal LAN 10.

In the system control unit 8, upon receiving the warm-up completion notification command from the image forming unit 2, the system control unit controller 98 transfers the stored image data to the image forming unit 2.

The image forming unit 2 then starts forming (printing) an image on the basis of the image data obtained from the system control unit 8.

Although it is not shown in FIG. 4, the feeder unit 6 also starts an operation for feeding paper after a procedure similar to that described above.

In this case, the image forming controller 92 and the feeder controller 96 of the feeder unit 6 send by broadcasting a command indicating that the image forming operation has started (image forming start notification command) to the other units via the internal LAN 10.

In contrast, it is not necessary that the image reading unit 3 perform an operation in response to the job start command from the system control unit 8 or the warm-up completion notification command from the image forming unit 2. Accordingly, the image reading unit 3 maintains the power mode in the power OFF state.

It is also not necessary that the UI unit 4 perform an operation in response to the job start command from the system control unit 8 or the warm-up completion notification command from the image forming unit 2. Accordingly, the UI unit 4 maintains the power mode in the power OFF state.

It is also not necessary that the FAX unit 5 perform an operation in response to the job start command from the system control unit 8 or the warm-up completion notification command from the image forming unit 2. Accordingly, the FAX unit 5 maintains the power mode in the power OFF state.

In the image forming unit 2 or in the feeder unit 6 that has started printing, the various controllers 22 provided for the image forming unit 2 or the feeder controller 96 provided for the feeder unit 6 may respectively determine and control as to whether power is to be supplied or stopped (ON or OFF) for the devices (mechanism system 23) forming the image forming unit 2 or for the devices forming the feeder unit 6 and also determine and control the power mode (ON or OFF) of the controllers.

Upon completion of printing by the image forming unit 2, the image forming controller 92 shifts the power mode of the image forming unit 2 from the power ON (24 V) state to the power ON (5 V) state, thereby turning OFF power supplied to the mechanism system 23 of the image forming unit 2. However, the image forming controller 92 maintains its operating state (5 V) for a predetermined period in order to receive various image data including subsequent print job data. The image forming controller 92 also sends by broadcasting a command indicating that printing has finished (image forming completion notification command) to the other units via the internal LAN 10. Then, if image data is not input after the lapse of a predetermined time, power to the image forming controller 92 is turned OFF, and the image forming unit 2 shifts to the power OFF state.

Although it is not shown in FIG. 5, the same applies to the feeder unit 6.

In the system control unit 8, upon receiving the image forming completion notification command from the image forming unit 2, the system control unit controller 98 maintains the power ON (24 V) state for a predetermined period, and then shifts to the power ON (5 V) state, thereby turning OFF power supplied to the mechanism system of the system control unit 8. However, the system control unit controller 98 maintains its operating state (5 V) for a predetermined period in order to wait for an input of a command received by broadcasting from the individual units via the internal LAN 10. If no command is input from any of the units after the lapse of a predetermined time, the system control unit 8 determines that no image information (various image data) is input into the image forming apparatus 1. Thus, the system control unit controller 98 shifts to the CPU OFF state so as to set the power saving mode.

Transition of Power Mode Upon Performing Copying Operation

FIG. 6 illustrates a transition state of the power mode when performing a copying operation.

As in the reception of FAX data or print job data, when performing a copying operation, the transition of the power mode in the individual units from when the image forming apparatus 1 is started after power is supplied from the power supply unit 9 via the power line 11 until when the image forming apparatus 1 shifts to the power saving mode is similar to that in the case of FAX reception shown in FIG. 4 or that in case of the reception of print job data shown in FIG. 5.

After shifting to the power saving mode, as shown in FIG. 6, when a document is set on the auto document feeder (ADF) provided in the image reading unit 3 or when the platen cover that covers the platen glass is opened and closed (detection of a document), the image reading unit 3 shifts to the power ON (5 V) state. Then, the image reading controller 93 of the image reading unit 3 sends by broadcasting a command indicating that a document has been set (document detection command) to the other units via the internal LAN 10.

Upon receiving the document detection command via the internal LAN 10 by broadcasting, the individual units determine on their own to set the power modes.

More specifically, in the UI unit 4, upon receiving the document detection command from the image reading unit 3, the UI unit 4 shifts from the power OFF state to the power ON (24 V) state. This turns ON the UI controller 94 and the mechanism system of the UI unit 4 so as to wait for a user to depress a copy start button (start button).

In the system control unit 8, upon receiving the document detection command from the image reading unit 3, the above-described ASIC provided for the system control unit 8 shifts the system control unit controller 98 from the CPU OFF state to the power ON (5 V) state. Then, the system control unit 8 waits for a copying operation to start.

In contrast, it is not necessary that the FAX unit 5 perform an operation in response to the document detection command from the image reading unit 3. Accordingly, the FAX unit 5 maintains the power mode in the power OFF state.

It is also not necessary that the image forming unit 2 perform an operation when receiving the document detection command. Accordingly, the image forming unit 2 maintains the power mode in the power OFF state. Although it is not shown in FIG. 6, the same applies to the feeder unit 6.

Subsequently, when the user has depressed the start button of the UI unit 4, the UI unit 4 sends by broadcasting a command indicating that the start button has been depressed (button depression command) to the other units via the internal LAN 10.

In the system control unit 8, upon receiving the button depression command from the UI unit 4, the system control unit controller 98 shifts the power mode from the power ON (5 V) state to the power ON (24 V) state, thereby turning ON the mechanism system of the system control unit 8. Then, the system control unit controller 98 sends by broadcasting a command (job start command) to start a copying processing (job) to the other units via the internal LAN 10.

Upon receiving the job start command from the system control unit 8, the image forming unit 2 shifts the power mode from the power OFF state to the power ON (24 V) state, thereby turning ON the mechanism system 23 (see FIG. 3) of the image forming unit 2 to start the image forming pre-operation (starting the job). More specifically, a warm-up operation for setting up a fixing device included in the mechanism system 23 to be ready for a fixing operation is started. Upon completion of the warm-up operation of the fixing device, the image forming controller 92 sends by broadcasting a command indicating that the warm-up operation has finished (warm-up completion notification command) to the other units via the internal LAN 10.

In the image reading unit 3, upon receiving the job start command from the system control unit 8, the image reading controller 93 shifts the image reading unit 3 from the power ON (5 V) state to the power ON (24 V) state, thereby turning ON the mechanism system of the image reading unit 3. The image reading controller 93 then waits for the warm-up completion notification command from the image forming unit 2.

Then, in the image reading unit 3, upon receiving the warm-up completion notification command from the image reading unit 2, the image reading controller 93 starts reading a document. The image reading controller 93 also sends by broadcasting a command indicating that reading of the document has started (document read start command) to the other units via the internal LAN 10.

In the system control unit 8, upon receiving the document read start command from the image reading unit 3, the system control unit controller 98 starts storing the image data sent from the image reading unit 3. When a predetermined amount of image data is stored, the system control unit controller 98 transfers the stored image data to the image forming unit 2.

The image forming unit 2 then starts image forming (printing) on the basis of the image data obtained from the system control unit 8.

Although it is not shown in FIG. 6, the feeder unit 6 also starts an operation for feeding paper after a procedure similar to that described above.

In this case, the image forming controller 92 and the feeder controller 96 of the feeder unit 6 send by broadcasting a command indicating that the image forming operation has started (image forming start notification command) to the other units via the internal LAN 10.

In the image forming unit 2 or in the feeder unit 6 that has started printing, the various controllers 22 provided for the image forming unit 2 or the feeder controller 96 provided for the feeder unit 6 may respectively determine and control as to whether power is to be supplied or stopped (ON or OFF) for the devices (mechanism system 23) forming the image forming unit 2 or for the devices forming the feeder unit 6 and may also determine and control the power modes (ON or OFF) of the controllers.

Referring back to the image reading unit 3, upon completion of reading the document by the image reading unit 3, the image reading controller 93 shifts the power mode of the image reading unit 3 from the power ON (24 V) state to the power ON (5 V) state, thereby turning OFF power supplied to the mechanism system of the image reading unit 3. However, the image reading controller 93 maintains its operating state (5 V) for a predetermined period in order to wait for a subsequent document to be read. The image reading controller 93 also sends by broadcasting a command indicating that reading of the document has finished (reading completion notification command) to the other units via the internal LAN 10.

In the system control unit 8, upon receiving the reading completion notification command from the image reading unit 3, the system control unit controller 98 identifies the reading completion notification command from the image reading unit 3 so as to finish storing the image data from the image reading unit 3. However, the system control unit 8 is still required to continue transferring the stored data to the image forming unit 2. The system control unit 8 has also identified the image forming start notification command from the image forming unit 2 and the feeder unit 6 that the image forming operation is being performed in the image forming unit 2 and the feeder unit 6. Accordingly, the system control unit controller 98 maintains the power ON (24 V) state in order to transfer the stored image data and to monitor the operation of the entire image forming apparatus 1.

Upon completion of printing by the image forming unit 2, the image forming controller 92 shifts the power mode of the image forming unit 2 from the power ON (24 V) state to the power ON (5 V) state, thereby turning OFF power supplied to the mechanism system 23 of the image forming unit 2. However, the image forming controller 92 maintains its operating state (5 V) for a predetermined period in order to receive various image data including subsequent image data from the image reading unit 3. The image forming controller 92 also sends by broadcasting a command indicating that printing has finished (image forming completion notification command) to the other units via the internal LAN 10. Then, if image data is not input after the lapse of a predetermined time, power to the image forming controller 92 is turned OFF, and the image forming unit 2 shifts to the power OFF state.

Although it is not shown in FIG. 6, the same applies to the feeder unit 6.

In the system control unit 8, upon receiving the image forming completion notification command from the image forming unit 2, the system control unit controller 98 maintains the power ON (24 V) state for a predetermined period, and then shifts to the power ON (5 V) state, thereby turning OFF power supplied to the mechanism system of the system control unit 8. However, the system control unit controller 98 maintains its operating state (5 V) for a predetermined period in order to wait for an input of a command received by broadcasting from any of the individual units via the internal LAN 10. If no command is input from any of the units after the lapse of a predetermined time, the system control unit 8 determines that no image information (various image data) is input into the image forming apparatus 1. Thus, the system control unit controller 98 shifts to the CPU OFF state so as to set the power saving mode.

As described above, in the image forming apparatus 1 of this exemplary embodiment, in each of the cases where FAX data is received, print job data is received, a copying operation is performed, the image forming function and the control functions individually determine their system states or the lapse of a predetermined time so as to change the power mode. More specifically, the image forming controller 92, the image reading controller 93, the UI controller 94, the FAX controller 95, the feeder controller 96, the memory controller 97, and the system control unit controller 98 individually determine the states of power supply/stop (ON or OFF) for the corresponding controllers from information to which a command has been appended obtained via the internal LAN 10 so as to control on their own as to whether power from the power supply unit 9 is to be supplied or stopped. Thus, power is supplied to the image forming function and the control functions in accordance with appropriate times. As a result, power saving can be achieved in each unit.

In this case, the various controllers provided in each unit may also control on their own as to whether power is to be supplied or stopped for the corresponding controllers and the corresponding devices in accordance with corresponding operation times. Thus, power is supplied to the various controllers and the corresponding devices in accordance with appropriate times. As a result, power saving can be achieved in each device.

Figure 7:
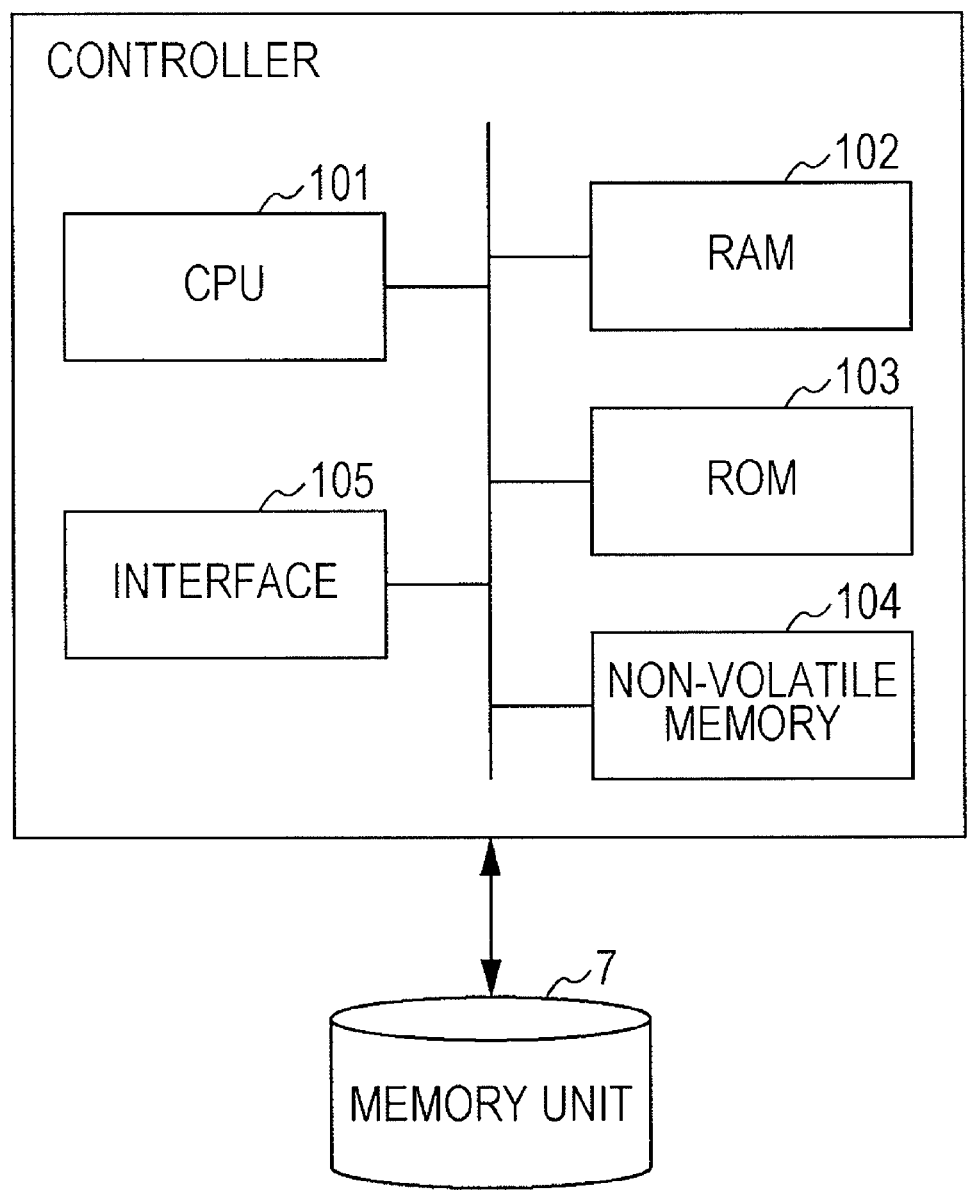
FIG. 7 illustrates a hardware configuration of a controller of one of an image forming function and various control functions.

FIG. 7 illustrates a hardware configuration of the image forming controller 92, the image reading controller 93, the UI controller 94, the FAX controller 95, the feeder controller 96, the memory controller 97, or the system control unit controller 98 of the image forming unit 2, the image reading unit 3, the UI unit 4, the FAX unit 5, the feeder unit 6, the memory unit 7, or the system control unit 8, respectively, which serves as the image forming function or the control function. It is noted that the controller shown in FIG. 7 is one of the above-described controllers. The controller shown in FIG. 7 includes a CPU 101, a RAM 102, a ROM 103, a non-volatile memory 104, and an interface 105. The CPU 101 serves as an example of a calculation unit that executes digital calculation processing in accordance with a predetermined program when controlling the transition of the power mode of the image forming function or the control function. The RAM 102 stores therein programs, etc. executed by the CPU 101.

The ROM 103 stores therein data, such as setting values used for the programs executed by the CPU 101. The non-volatile memory 104 is, for example, an EEPROM or a flash memory, which is rewritable and can retain data even after power is OFF. The interface 105 controls input/output of signals into or from devices which are connected to the controller.

The memory unit 7 stores therein processing programs executed by the corresponding controllers. Each controller reads a corresponding processing program from the memory unit 7 so as to execute control processing for the power mode of the image forming function or the control function. That is, a program for executing control processing for the power mode of the image forming function or the control function is read from a hard disk or a digital versatile disk (DVD)-ROM, which is the memory unit 7, into the RAM 102 within the controller. Then, on the basis of the program read into the RAM 102, the CPU 101 executes various types of processing. The provision of the program is not restricted to the mode described above. For example, the program may be stored in the ROM 103 in advance and may be loaded into the RAM 102. Alternatively, if the ROM 103 is a rewritable storage device, such as an EEPROM, the program may be installed into the ROM 103 and may be loaded into the RAM 102 after setting the controller. The program may be transmitted to the controller via the external LAN 12, such as the Internet, and may be installed in the ROM 103 and loaded into the RAM 102.

As described above, in the image forming apparatus 1 of this exemplary embodiment, when performing various image processing operations, the image forming function and the various controllers individually determine on their own their system states or the lapse of a predetermined time so as to change the power modes. With this configuration, power is supplied to the image forming function and the various control functions in accordance with appropriate operation times. As a result, power saving can be achieved in each unit.

In this case, the various controllers provided in each unit may also control on their own as to whether power is to be supplied or stopped for the corresponding controllers and the corresponding devices in accordance with corresponding operation times. Thus, power is supplied to the various controllers and the corresponding devices in accordance with appropriate times. As a result, power saving can be achieved in each device.

First Exemplary Embodiment

Figure 8:
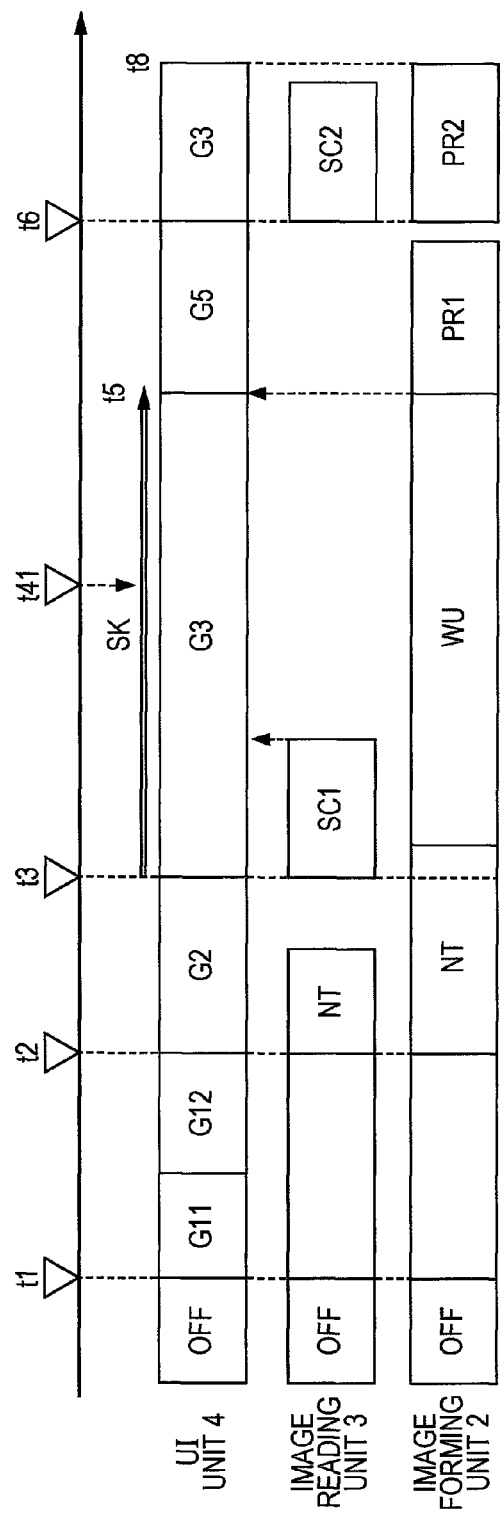
FIG. 8 is a timing chart illustrating an example of control processing according to a first exemplary embodiment.

FIG. 8 is a timing chart illustrating an example of control processing according to a first exemplary embodiment of the invention.

All of the image reading unit 3, the UI unit 4, the FAX unit 5, the feeder unit 6, the memory unit 7, and the system control unit 8 are in the OFF state, and are thus in the power saving mode. In this state, as shown in FIG. 8, when the user presses the power saving button 140 (see FIG. 2) of the UI unit 4 at time t1, the UI controller 94 of the UI unit 4 shifts the power state of the UI unit 4 to the LED OFF state so as to cancel the power saving mode. At this time, a power saving mode canceling command to return from the power saving mode is not broadcast to the other units, i.e., the image forming unit 2, the image reading unit 3, the FAX unit 5, and the system control unit 8. Accordingly, the other units remain in the power OFF state. Thus, at time t1, only the UI unit 4 has canceled the power saving mode.

More specifically, the UI unit 4 displays an image G11 showing that the screen is being changed, followed by an image G12 showing a menu. The image G12 includes not only an image of the copy button 142 (see FIG. 2), but also images of the scan button, the fax sending button, etc. This allows the user to press the buttons of the UI unit 4.

When the user presses the copy button 142 of the UI unit 4 at time t2, the UI controller 94 of the UI unit 4 switches from the image G12 to an image G2 showing the settings concerning copying (copy service screen). When the image G2 is being displayed, the user is able to perform various settings concerning copying, for example, the selection of color printing or the number of copies.

Pressing the copy button 142 causes the UI controller 94 to broadcast a power saving mode canceling command to the image forming unit 2 and the image reading unit 3 via the internal LAN 10. The image forming unit 2 and the image reading unit 3 shift from the power OFF state to the power ON (5 V) state so as to start initialization processing NT.

The image reading unit 3 finishes initialization processing NT earlier than the image forming unit 2. Accordingly, after finishing the initialization processing NT, the image reading unit 3 is able to start reading an image of a document before the image forming unit 2 finishes the initialization processing NT.

When the user presses the start button 180 of the system control unit 8 at time t3, the UI controller 94 of the UI unit 4 switches from the image G2 to an image G3 showing that a copying operation is being performed. At time t3, the image reading unit 3 has already finished the initialization processing NT, and it immediately starts image reading processing SC1 for reading an image of the document. The image data read by the image reading processing SC1 is temporarily stored in the RAM 174 (see FIG. 2) of the memory unit 7. This image reading processing SC1 is a first operation which is performed after the power saving mode has been canceled. Since the image forming unit 2 has not finished the initialization processing NT, paper output is not performed.

If the user presses the start button 180 of the system control unit 8 before the image reading unit 3 has finished the initialization processing NT, the image reading unit 3 waits for the image reading unit 3 to finish the initialization processing NT and then performs the image reading processing SC1.

After finishing the initialization processing NT, the image forming unit 2 performs warm-up processing WU for setting up a fixing device. When the image forming unit 2 has finished the warm-up processing WU and is ready to perform printing processing PR1 at time t5, it starts the printing processing PR1 on the image read by the image reading processing SC1. When the image forming unit 2 has started the printing processing PR1, the UI unit 4 switches the image G3 showing that a copying operation is being performed to an image G5 showing that a next copying instruction can be received.

The image forming unit 2 performs the printing processing PR1, whereby printed paper is output.

During a period from when a first copying instruction is received after returning from the power saving mode until when a next copying instruction is received, a copying instruction reception prohibition period SK is set. During the copying instruction reception prohibition period SK, after the image reading unit 3 has finished the image reading processing SC1, it does not start subsequent image reading processing SC2 even if the start button 180 is repressed. More specifically, even if the user presses the start button 180 of the system control unit 8 (see time t41) during a period from time t3 to time t5, the corresponding copying operation is not started. The corresponding copying operation to be performed by pressing the start button 180 at time t41 is not performed even after the lapse of the copying instruction reception prohibition period SK. After time t5 after the lapse of the copying instruction reception prohibition period SK, a next copying operation is received.

If the user presses the start button 180 at time t41, an image (not shown) showing that a copying instruction cannot be received may be displayed on the screen of the UI unit 4 or alarm sound may be issued.

The reason for setting the copying instruction reception prohibition period SK is as follows. In response to a copying instruction given by operating the start button 180 after the power saving mode has been canceled, the image reading unit 3 is able to start the image reading processing SC1 in considerably an early time, but the image forming unit 2 is not able to start the printing processing PR1 in an early time. From a user's viewpoint, it is not clear whether the first copying instruction given by pressing the start button 180 after the power saving mode has been canceled has been received, and thus, the user may perform an operation again to input another copying instruction. In this case, both the first copying instruction and the next copying instruction have been received. As a result, two copying operations, which are not intended by the user, are erroneously performed.

Because of this reason, in this exemplary embodiment, the copying instruction reception prohibition period SK is set as a period during which a next copying instruction is not received. In the first exemplary embodiment, the end of the copying instruction reception prohibition period SK is set at a point (time t5) when the image forming unit 2 has finished the warm-up processing WU and is ready to perform the printing processing PR1.

The state in which the image forming unit 2 is ready to perform the printing processing PR1 is an example of a specific state.

After the lapse of the copying instruction reception prohibition period SK, the user presses the start button 180 of the system control unit 8 at time t6. Then, the UI unit 4 switches from the image G5 to the image G3 showing that a copying operation is being performed, the image reading unit 3 starts image reading processing SC2, and the image forming unit 2 starts printing processing PR2.

When the image forming unit 2 has finished the printing processing PR2 at time t8, the UI unit 4 switches from the image G3 showing that a copying operation is being performed to another image, e.g., the image G5 showing that a next copying instruction can be received.

Second Exemplary Embodiment

Figure 9:
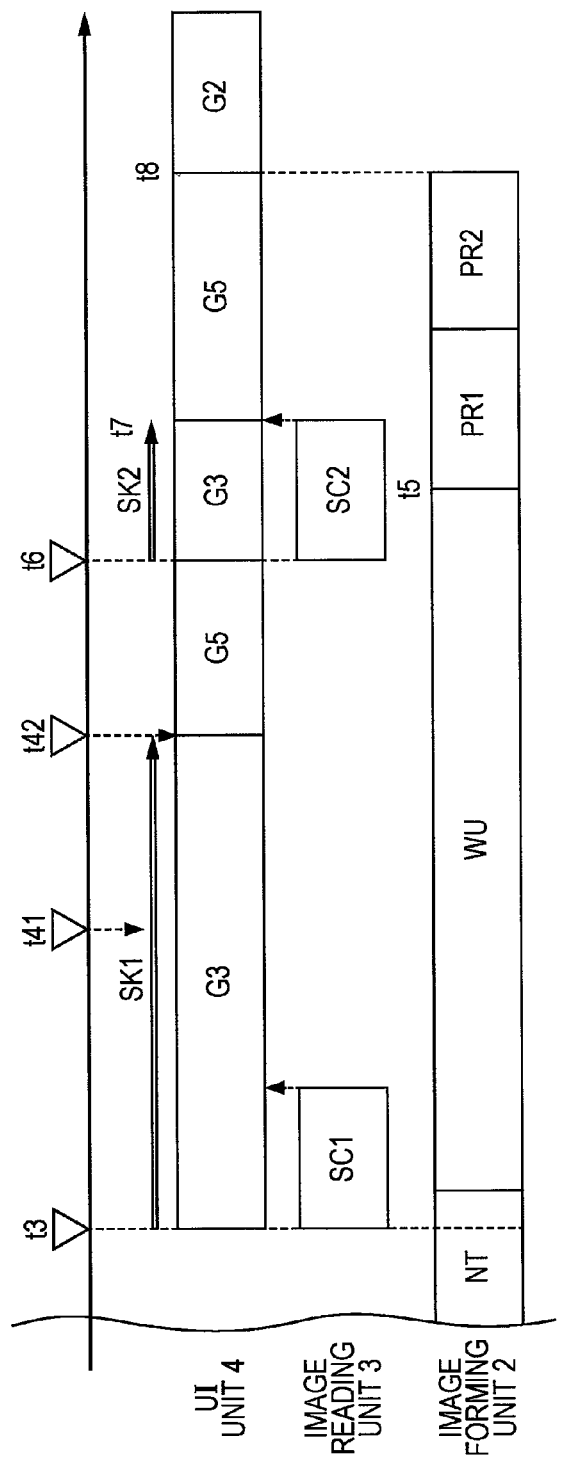
FIG. 9 is a timing chart illustrating an example of control processing according to a second exemplary embodiment.

FIG. 9 is a timing chart illustrating an example of control processing according to a second exemplary embodiment of the invention. In the second exemplary embodiment, elements having the same configurations and functions as those of the first exemplary embodiment are designated by like reference numerals, and an explanation and representation thereof in the drawing may be omitted.

In the example shown in FIG. 9, upon receiving a first copying instruction after the power saving mode has been canceled, the image forming unit 2 performs initialization processing NT. In this state, the platen cover 34 (see FIG. 1) of the image reading unit 3 is opened while the warm-up processing WU is being performed in the image forming unit 2.

This will be more specifically described. While the warm-up processing WU is being performed, the printing processing PR1 which follows the warm-up processing WU has not yet started. In this state, if the user opens the platen cover 34 (see FIG. 1) at time t42, the UI unit 4 switches from the image G3 showing that a copying operation is being performed to the image G5 showing that a next copying instruction can be received. That is, opening the platen cover 34 causes the UI unit 4 to display on the screen that image reading can be performed.

This will be further described. At time t42, the copying instruction reception prohibition period SK1 still continues. Accordingly, even if the user presses the start button 180, a next copying instruction is not received. However, since the platen cover 34 is opened, it can be assumed that the user wishes to give an instruction to copy another document. Thus, when the platen cover 34 is opened at time t42, the copying instruction reception prohibition period SK1 is ended, and the UI unit 4 displays the image G5 showing that a next copying instruction can be received.

In the second exemplary embodiment, opening the platen cover 34 causes the copying instruction reception prohibition period SK1 to end. However, user operations other than this may end the copying instruction reception prohibition period SK1. For example, upon detecting by using the document detection sensor 130 (see FIG. 1) of the image reading unit 3 that a document is set, the copying instruction reception prohibition period SK1 may be ended. Opening the platen cover 34 or detecting the setting of a document by using the document detection sensor 130 is an example of the specific state.

When the user presses the start button 180 of the system control unit 8 at time t6, another copying instruction reception prohibition period SK2 is set again. This is because, at this time (time t6), the image forming unit 2 has not finished the copying processing PR1, and the user may unintentionally perform another copying operation. The copying instruction reception prohibition period SK2 is canceled at some time after the image forming unit 2 starts the printing processing PR1 at time t5. More specifically, the end of the copying instruction reception prohibition period SK2 is set when the image reading unit 3 finishes the image reading processing SC2 at time t7.

Third Exemplary Embodiment

Figure 10:
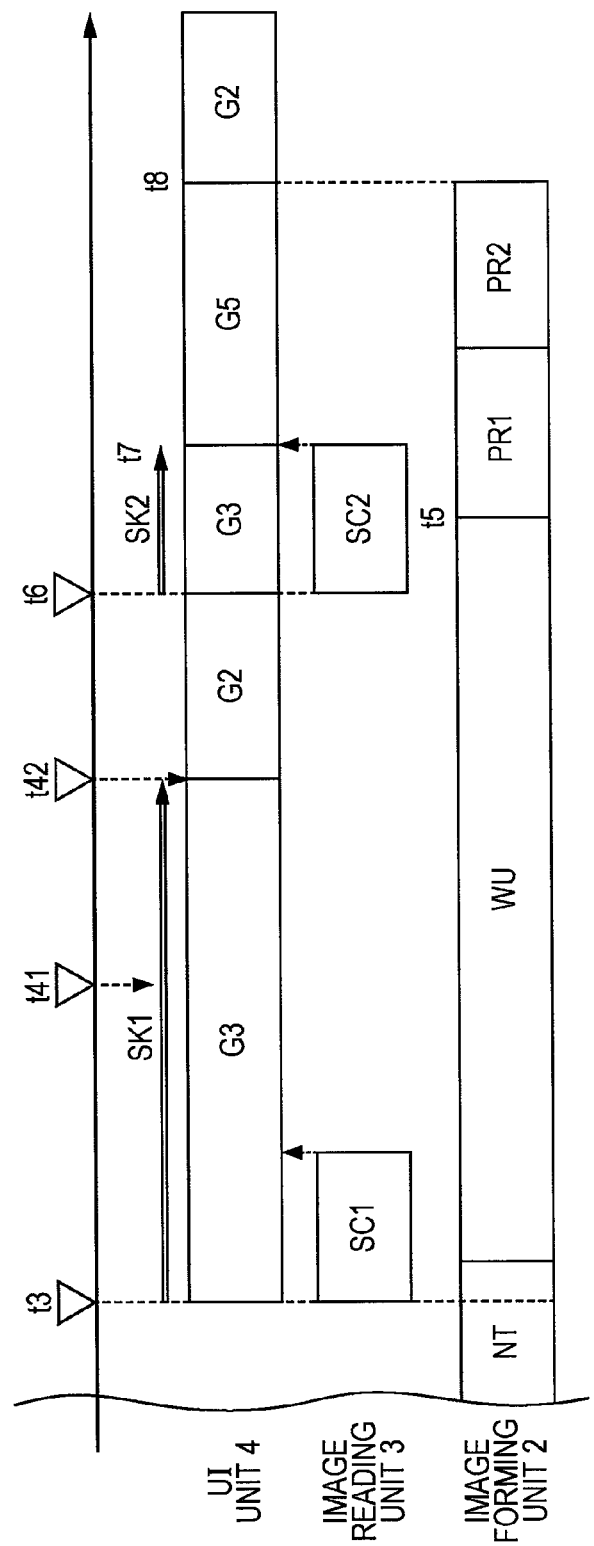
FIG. 10 is a timing chart illustrating an example of control processing according to a third exemplary embodiment.

FIG. 10 is a timing chart illustrating an example of control processing according to a third exemplary embodiment of the invention. In the third exemplary embodiment, elements having the same configurations and functions as those of the first or second exemplary embodiment are designated by like reference numerals, and an explanation and representation thereof in the drawing may be omitted.

In the example shown in FIG. 10, upon receiving a first copying instruction after the power saving mode has been canceled, the image forming unit 2 performs initialization processing NT. In this state, a button (an example of a third operation unit) other than the copy button 142 of the UI unit 4 is pressed while the warm-up processing WU is being performed in the image forming unit 2.

More specifically, in the third exemplary embodiment, instead of the operation for opening the platen cover 34 at time t42 in the second exemplary embodiment, another user operation causes the copying instruction reception prohibition period SK1 to end. That is, while the warm-up processing WU is being performed, the printing processing PR1 which follows the warm-up processing WU has not yet started. In this state, if a close button (not shown) or a next scan button (not shown) of the UI unit 4 is pressed at t43, the UI unit 4 displays the image G2 showing the settings concerning copying, and the copying instruction reception prohibition period SK1 is ended. Such a close button or a next scan button is an example of the specific state.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    an apparatus body that implements a plurality of functions including an image reading function of reading an image of a document, an image forming function of forming an image, and a display function of displaying content of information provided for a user;
    a controller that controls a first power state, a second power state, and a third power state, the first power state being a state in which one of the plurality of functions is being performed, the second power state being a state in which one of the plurality of functions is ready to be performed, the third power state being a state in which there is no power to perform any of the plurality of functions or the third power state being a state in which power is lower than power in the first power state or the second power state;
    a first operation unit that outputs, as a result of being operated by a user, a transition signal for shifting the state of the image reading function and the state of the image forming function to the second power state;
    a second operation unit that outputs, as a result of being operated by a user, a copy start signal for starting an operation to copy a document by using the image reading function and the image forming function; and
    a copy controller that controls, when the plurality of functions other than the display function are in the third power state, the operation to copy a document in accordance with a copy start signal which is output from the second operation unit after a transition signal is output from the first operation unit, and that performs control so that another copy start signal which is subsequently output from the second operation unit is not handled during a period from when controlling of the operation to copy a document has started until when a predetermined specific state is detected.

2. The image forming apparatus according to claim 1, further comprising:
    a document ready detector that outputs a signal upon detecting an operation performed by a user to prepare a document to be copied,
    wherein, when the signal is output from the document ready detector, the copy controller determines that the predetermined specific state has been detected and performs control.

3. The image forming apparatus according to claim 1, further comprising:
    a third operation unit that outputs, as a result of being operated by a user, a signal representing an instruction to start a subsequent operation to copy a document, the third operation unit being different from the second operation unit, wherein, when the signal is output from the third operation unit, the copy controller determines that the predetermined specific state has been detected and performs control.

4. The image forming apparatus according to claim 1, wherein, when the image forming function is shifted to the second power state, the copy controller determines that the predetermined specific state has been detected and performs control.

5. An image forming method for an image forming apparatus that implements a plurality of functions including an image reading function of reading an image of a document, an image forming function of forming an image, and a display function of displaying content of information provided for a user, the image forming method comprising:

controlling a first power state, a second power state, and a third power state, the first power state being a state in which one of the plurality of functions is being performed, the second power state being a state in which one of the plurality of functions is ready to be performed, the third power state being a state in which there is no power to perform any of the plurality of functions or the third power state being a state in which power is lower than power in the first power state or the second power state;

receiving, in response to an operation performed by a user, a transition signal for shifting the state of the image reading function and the state of the image forming function to the second power state;

receiving, in response to an operation performed by a user, a copy start signal for starting an operation to copy a document by using the image reading function and the image forming function; and controlling, when the plurality of functions other than the display function are in the third power state, the operation to copy a document in accordance with a copy start signal which is received after a transition signal is received, and performing control so that another copy start signal which is subsequently received is not handled during a period from when controlling of the operation to copy a document has started until when a predetermined specific state is detected.

6. A non-transitory computer readable medium storing a program causing a computer to execute a process, the computer being provided in an image forming apparatus that implements a plurality of functions including an image reading function of reading an image of a document, an image forming function of forming an image, and a display function of displaying content of information provided for a user, the process comprising: controlling a first power state, a second power state, and a third power state, the first power state being a state in which one of the plurality of functions is being performed, the second power state being a state in which one of the plurality of functions is ready to be performed, the third power state being a state in which there is no power to perform any of the plurality of functions or the third power state being a state in which power is lower than power in the first power state or the second power state; receiving, in response to an operation performed by a user, a transition signal for shifting the state of the image reading function and the state of the image forming function to the second power state; receiving, in response to an operation performed by a user, a copy start signal for starting an operation to copy a document by using the image reading function and the image forming function; and controlling, when the plurality of functions other than the display function are in the third power state, the operation to copy a document in accordance with a copy start signal which is received after a transition signal is received, and performing control so that another copy start signal which is subsequently received is not handled during a period from when controlling of the operation to copy a document has started until when a predetermined specific state is detected.

7. The non-transitory computer readable medium according to claim 6, the process further comprising: receiving a detection signal indicating that an operation performed by a user to prepare a document to be copied has been detected, wherein, when the detection signal is received, it is determined that the predetermined specific state has been detected and control is performed.

8. The non-transitory computer readable medium according to claim 6, the process further comprising: receiving, in response to an operation performed by a user, a signal representing an instruction to start a subsequent operation to copy a document, wherein, when the signal is received, it is determined that the predetermined specific state has been detected and control is performed.

9. The non-transitory computer readable medium according to claim 6, wherein, when the image forming function is shifted to the second power state, it is determined that the predetermined specific state has been detected and control is performed.

* * * * *